United States Patent [19]

Bows et al.

[11] Patent Number: 5,580,595
[45] Date of Patent: Dec. 3, 1996

[54] PROCESS FOR THE PREPARATION OF A FOOD PRODUCT

[75] Inventors: John R. Bows, Northamptonshire; James T. Mullin, Northants, both of Great Britain

[73] Assignee: Unilever Patent Holdings B.V., Vlaardingen, Netherlands

[21] Appl. No.: 331,169

[22] Filed: Oct. 28, 1994

[30] Foreign Application Priority Data

Nov. 1, 1993 [EP] European Pat. Off. .............. 93308701

[51] Int. Cl.⁶ ...................................................... A23L 1/00
[52] U.S. Cl. .......................................... 426/244; 426/305
[58] Field of Search ................................. 426/244, 303, 426/305, 307

[56] References Cited

U.S. PATENT DOCUMENTS

| | | | |
|---|---|---|---|
| 3,472,200 | 10/1969 | Gerling | 118/5 |
| 3,478,187 | 11/1969 | Agdur et al. | 219/10.55 |
| 3,814,983 | 6/1974 | Weissfloch et al. | 315/39 |
| 4,399,341 | 8/1983 | Yasuoka | 219/10.55 R |
| 4,435,629 | 3/1984 | Ishimaru et al. | 219/10.55 A |
| 4,471,192 | 9/1984 | Awata et al. | 219/10.55 A |
| 4,625,088 | 11/1986 | Gics | 219/10.55 A |
| 4,847,460 | 7/1989 | Kieser et al. | 219/10.55 A |
| 5,015,489 | 5/1991 | Van Lengerich et al. | 426/244 |

FOREIGN PATENT DOCUMENTS

| | | | |
|---|---|---|---|
| 0289862 | 11/1988 | European Pat. Off. | A23P 1/08 |
| 2353905 | 3/1975 | Germany | A23P 1/00 |

OTHER PUBLICATIONS

Lopez–Gavito et al, Journal of Microwave Power, vol. 18, No. 4, pp. 345–353 (1983).

*Primary Examiner*—George Yeung
*Attorney, Agent, or Firm*—Cushman Darby & Cushman, LLP

[57] ABSTRACT

A process for the manufacture of a coated foodstuff comprising a substantially uncooked foodstuff portion enrobed in a heat-set batter whereby the batter is set by exposing the coated foodstuff to targeted dielectric heat.

9 Claims, No Drawings

PROCESS FOR THE PREPARATION OF A FOOD PRODUCT

FIELD OF THE INVENTION

The invention relates to a novel process for the manufacture of a coated foodstuff comprising a substantially uncooked foodstuff portion enrobed in a heat-set batter whereby the batter is set by exposing the coated foodstuff to targeted dielectric heat.

BACKGROUND TO THE INVENTION AND PRIOR ART

Many conventional food products are prepared and sold in the form of foodstuff portions that are coated with batter or with a layer of batter that is itself coated with breadcrumbs or a granular composition resembling breadcrumbs. Conventionally the former are known as "battered" foodstuffs and the latter as "breaded" foodstuffs. Generally, such coated foodstuffs are marketed in a substantially uncooked state and the consumer prepares them for consumption by, for example, deep or shallow frying.

Traditionally it has been found necessary to heat-set the batter in the coating after it has been applied to the foodstuff. Heat-setting imparts to the coated foodstuff sufficient cohesion and robustness for the coated foodstuff to be handled during subsequent operations, such as packaging, prior to deep freezing and ensures that the batter remains stable and cohesive if the coated foodstuff subsequently thaws.

Conventionally, heat-setting of the batter is performed by frying the coated foodstuff briefly in hot oil. For example, in a conventional process for producing fish fingers, individual fish sticks (prepared by sawing a block of frozen fish) are battered and breaded, and then fried at 180° C. for 30 to 40 seconds, before being packed and refrozen.

Heat-setting of the batter by frying has several inherent disadvantages. Oil is absorbed during frying and this tends to produce an unnecessarily high level of oil (6–7%) in the coated foodstuff. Moreover, it is often necessary to discard some or all of the oil because it undergoes thermal degradation. Hence, frying is expensive because the high grade oil must be replenished continuously.

It is thus desirable to be able to find novel processes for selectively heating the outer surface of food products in order to be able to heat-set coatings.

DISCLOSURE OF THE INVENTION

Accordingly the invention provides a process for the manufacture of a coated foodstuff comprising a substantially uncooked foodstuff portion enrobed in a heat-set batter, in which process a heat-settable batter is applied to a portion of the foodstuff and the bather is set by exposing the coated foodstuff to targeted dielectric heat for a period of time that is sufficient to set the batter but insufficient to cause any significant cooking or overheating of the foodstuff.

By targeting is meant that the penetration of the dielectric heat is restricted to the foodstuff coating. This enables the batter to be set without any significant heating or cooking of the foodstuff portion.

Preferably the frequency of the dielectric heat is from 0.8 to 10 GHz, most preferably from 0.8 to 5 GHz.

Preferably the foodstuff is exposed to dielectric heat having a frequency within a designated Industrial, Scientific and Medical (ISM) band. Examples of suitable bands are 915, 2450 and 5800 MHz. Use of dielectric heat having a frequency within a designated ISM band removes the requirement to prevent unacceptable leakage into the environment.

When the frequency of the dielectric heat is above approximately 3 GHz, the penetration depth of the heat energy is typically similar to the depth of the batter, and therefore further targeting is not essential. The precise frequency at which this is true is mostly dependant on the batter composition and thickness.

When the frequency of the dielectric heat is from 0.8 to 5 GHz the dielectric heat may be targeted onto the surface of the foodstuff by a fringing field applicator (which includes slow wave applicators, surface wave applicators and striplines). Suitable fringing field applicators are described in the U.S. Pat. Nos. 3,472,200, 3,478,187, 3,814,983, 4,399,341, 4,435,629, 4,471,192, 4,625,088 and 4,847,460.

The setting of the batter in the coating can be accomplished by passing the coated foodstuff underneath a source of dielectric heat which has been suitably focused as required. Alternatively the coated foodstuff may be simultaneously exposed to a source of dielectric heat both from above and below. Preferably the coated foodstuff will be placed onto a conveyor belt which then passes into the dielectric heat exposure area. The speed of the conveyor belt will clearly determine the length of exposure to the dielectric heat source. The optimum exposure time is dependant upon the power of the dielectric heat source used.

With a dielectric heat frequency of 2.45 GHz, whereby the dielectric heat is focused by a fringing field applicator, the distance between the coating of the foodstuff and the fringing field applicator is preferably from 2 to 3 mm and the foodstuff is preferably exposed to the dielectric heat source for approximately 1 second.

Although in general coated foodstuff of the type to which the invention relates are cooked by the consumer by frying, certain coated foodstuffs are occasionally grilled or microwaved by the consumer. The oil absorbed by a conventional coated foodstuff during the frying step involved in its manufacture may facilitate grilling or microwaving. Accordingly it may be desired that a coated foodstuff of the invention should contain a certain amount of oil. Therefore the process for the manufacture of the coated foodstuff may optionally include applying oil to the surface of the foodstuff either before or after setting the batter using dielectric heat. Preferably from 0.1 to 4% by weight of the foodstuff oil is applied.

The oil may be applied to the surface of the food product either by brushing the surface of the foodstuff with oil, spraying on the oil, or by incorporation of the oil into the batter or, if used, crumb coating.

Preferably the foodstuff portion is selected from fish, poultry, red meat, vegetables and mixtures thereof. It is preferred that the foodstuff portion is frozen or chilled, most preferably the foodstuff portion is frozen, before application of the batter and subsequent exposure to the dielectric heat.

The portion of foodstuff once coated with a heat-settable batter may optionally then be breaded with breadcrumbs or other particulate coating materials prior to being exposed to the dielectric heat. It is preferred that the batter and/or crumb is chilled before exposure to the dielectric heat.

EXAMPLES

The invention is illustrated with reference to the following examples in accordance with the invention.

Dielectric energy having a frequency of 2.45 GHz was generated using a magnetron. This was guided through a waveguide system (WR284) into a fringing field applicator (Gerling GL510) terminated with a dummy load.

A frozen fish portion (13.2 g) was battered (3.2 g) and crumbed (2.6 g). The batter comprised water (57.5%), wheat flour (19.6%), starch (20.1%) and salt (2.5%). Conventional breadcrumbs were used having a diameter of from 0.1 to 1 mm.

EXAMPLE 1

The coated fish portion was placed on a conveyor belt and presented to the dielectric energy. The coating of the fish portion was positioned 2 to 3 mm from the applicator. Different power settings and exposure times were tested. Results, expressed as the percentage of the heated batter surface that had been set, are shown in Table 1. The batter was considered to be set when the coating could be "peeled" off the fish core in one piece.

TABLE 1

| Exposure Time (sec) | Power (w) | | |
|---|---|---|---|
| | 1000 | 1500 | 2000 |
| 2.5 | 0% | 80% | 90% |
| 1.7 | — | — | 90–100% |
| 1.1 | — | — | 80% |
| 0.8 | — | — | 0% |

At values of 80% or more for batter setting, the batter remained on the fish portion after being stored frozen and then grilled. The cooled fish product was judged to be satisfactory by an untrained taste panel.

EXAMPLE 2

The coated fish portion was placed on a conveyor belt and presented to the dielectric energy. The power setting was 2000 W. The effect of distance between the coating of the fish portion and the applicator and exposure time was tested. Results are shown in Table 2. The data is presented in the same way as for Example 1.

TABLE 2

| Exposure Time (sec) | Distance from coating to applicator (mm) | | |
|---|---|---|---|
| | 1–2 | 2–3 | 4–5 |
| 2.5 | — | 90% | 0% |
| 1.7 | — | 90–100% | — |
| 1.1 | 80% | 80% | — |
| 0.8 | — | 0% | — |

We claim:

1. A process for the manufacture of coated foodstuff comprising a substantially uncooked foodstuff portion enrobed in a heat-set batter, which process comprises:
   a) applying a heat-settable batter to a portion of the foodstuff and
   b) exposing the coated foodstuff to targeted dielectric heat for a period of time that is sufficient to set the batter but insufficient to cause any significant cooking or overheating of the foodstuff.

2. A process according to claim 1 wherein the frequency of the targeted dielectric heat is from 0.8 to 10 GHz.

3. A process according to claim 1 wherein the frequency of the dielectric heat is from 0.8 to 5 GHz.

4. A process according to claim 1 wherein the dielectric heat is targeted onto the surface of the foodstuff by a fringing field applicator.

5. A process according to claim 1 wherein the process additionally includes applying oil to the surface of the coated foodstuff either before or after setting the batter using dielectric heat.

6. A process according to claim 5 wherein from 0.1 to 4% by weight of the foodstuff oil is applied.

7. A process according to claim 5 wherein the oil is applied to the foodstuff via spraying.

8. A process according to claim 1 wherein the foodstuff portion is selected from the group consisting of fish, poultry, red meat, vegetables and mixtures thereof.

9. A process according to claim 1 wherein the portion of the foodstuff is coated with heat-settable batter and is then breaded prior to being exposed to dielectric heat.

* * * * *